United States Patent [19]
Matsuda

[11] Patent Number: 5,454,523
[45] Date of Patent: Oct. 3, 1995

[54] ELONGATE OBJECT CUTTING APPARATUS

[75] Inventor: Isamu Matsuda, Shiauoka, Japan

[73] Assignee: Yazaki Corporation, Tokyo, Japan

[21] Appl. No.: 195,711

[22] Filed: Feb. 14, 1994

[30] Foreign Application Priority Data

Feb. 12, 1993 [JP] Japan .................................. 5-024249
Jun. 15, 1993 [JP] Japan .................................. 5-143655

[51] Int. Cl.$^6$ .................................................. B02C 18/06
[52] U.S. Cl. ............................. 241/242; 241/100; 83/349
[58] Field of Search ..................... 241/242, 243; 83/356.3, 349, 566

[56] References Cited

U.S. PATENT DOCUMENTS

| | | | |
|---|---|---|---|
| 355,898 | 1/1887 | Taylor | 83/349 X |
| 2,405,692 | 8/1946 | Hall | 241/242 X |
| 3,779,123 | 12/1973 | Chafee | 241/243 X |
| 3,799,020 | 3/1974 | Hoelmer | 83/349 |
| 4,028,779 | 6/1977 | Shah | 241/242 X |
| 4,422,358 | 12/1983 | Hull et al. | 241/243 X |
| 4,664,006 | 5/1987 | Mitchell | 241/242 X |
| 4,960,020 | 10/1990 | Reinhard | 83/349 X |
| 4,969,605 | 11/1990 | Morin | 241/242 X |
| 5,001,952 | 3/1991 | Myogadani | 83/349 X |

FOREIGN PATENT DOCUMENTS 1268201  11/1986  U.S.S.R. .................................. 241/242

Primary Examiner—Timothy V. Eley
Attorney, Agent, or Firm—Armstrong, Westerman, Hattori, McLeland & Naughton

[57] ABSTRACT

An elongate object cutting apparatus which can cut an elongate object finely and at a high speed while production of vibrations or noises is reduced is disclosed. The elongate object cutting apparatus is suitably used to cut a flexible elongate object such as a terminal carrier having a plurality of terminals connected in the form of a chain in a process of manufacturing a wire harness or a wire or an electric wire for use with a wire electrode electric discharge machine, into small pieces. The elongate object cutting apparatus comprises a fixed blade secured to a frame, a rotary blade having a plurality of knife edges on an outer periphery thereof and mounted for rotation on the frame such that the knife edges thereof successively contact with the fixed blade during rotation thereof. While the rotary blade is rotated, an elongate object is supplied between and cut by cooperation of the fixed blade and the rotary blade.

6 Claims, 8 Drawing Sheets

ELONGATE OBJECT CUTTING APPARATUS

BACKGROUND OF THE INVENTION

1. Field of the Invention

This invention relates to an elongate object cutting apparatus which is used to cut into fragments or small pieces a flexible elongate object such as a terminal carrier having a plurality of terminals connected in the form of a chain in a process of manufacturing a wire harness for use with an electric circuit or a wire, or an electric wire for use with a wire electrode electric discharge machine.

2. Description of the Prior Art

A process of manufacturing a wire harness includes the step of connecting a conductor and a terminal to each other. Normally at such connection step, a belt-shaped metal plate is worked by press work to form such a terminal chain c as seen in FIG. 7. Referring to FIG. 7, the terminal chain c includes a terminal carrier b to which a plurality of terminals a are connected in a predetermined spaced relationship from each other. Then, the terminal chain c is supplied to a press connection step for press connection to a conductor, or the like, to successively connect the terminals a to conductors, whereafter the terminal carrier b and the terminals a are cut away from each other. The terminal carrier b, thus cut away, is then cut into small pieces for the individual terminals a, and the thus cut small pieces are discharged.

An exemplary conventional apparatus for cutting such a flexible elongate member as the terminal carrier b described above into small pieces is shown in FIG. 8. In particular, in order to prevent the terminal carrier b from being scattered when it is cut into small pieces, the terminal carrier b is taken away, upon pressure connection thereof to a conductor, as it is, while it remains in the form of a belt without cutting it into individual small pieces, and then at another place, it is cut into and collected as small pieces in the form of chips using such a terminal carrier cutting apparatus K as shown in FIG. 8.

Referring to FIG. 8, the terminal carrier cutting apparatus K includes a sliding blade driving section d which is moved back and forth by a solenoid or a hydraulic cylinder, a sliding blade e connected to the sliding blade driving section d, a channel-shaped fixed blade f, and a sliding guide plate g. A chip box h is located below the sliding guide plate g for collecting small pieces in the form of chips cut from the terminal carrier b.

The terminal carrier b is supplied into an annular hole i defined by the channel-shaped fixed blade f and the sliding blade e, and the sliding blade e is moved back and forth in the directions indicated by a pair of arrow marks in FIG. 8 by the sliding blade driving section d.

In the terminal carrier cutting apparatus K described above, when the driving blade e is driven, the difference between a load operation condition and a no-load operation condition is so great that such vibrations or noises as may move the entire apparatus are produced. Further, where a solenoid is employed for the sliding plate driving section d, not only a timer, a relay and some other circuit elements are required for the electric circuit for the solenoid, but also a bad influence of electric noise is sometimes had on various elements around the apparatus.

Such a terminal carrier cutting apparatus as shown in FIG. 9 has been proposed in Japanese Patent Application No. Heisei 4-231919 by the assignee of the present invention.

Referring to FIG. 9, the terminal carrier cutting apparatus is denoted at L and is constructed such that a movable blade lever k is rocked around a support shaft m in accordance with rotation of a cam j which is driven by a motor so that a blade (not shown) provided at an edge of the movable blade lever k and a fixed blade n are repetitively moved into engagement and disengagement with and from each other to intermittently cut a carrier b supplied between the blade of the movable blade lever k and the fixed blade n.

Accordingly, the terminal carrier cutting apparatus L is advantageous in that it produces less vibrations and noises and is simple in structure and small in size as compared with the conventional wire electrode discharge machine described above with reference to FIG. 8 which involves back and forth movement of the sliding blade e. However, the terminal carrier cutting apparatus L still is limited as to increases of cutting speed and reduction in cutting length since cutting is performed by a rocking motion of the movable blade lever k. Consequently, the terminal carrier cutting apparatus L is disadvantageous in that enhancement of the productivity of the cutting step and fine cutting cannot be achieved.

A further exemplary flexible elongate object cutting apparatus is a cutting apparatus for cutting a wire used as an electrode of a wire electrode discharge machine.

A wire electrode discharge machine is constructed such that a wire for electrodes is normally fed by means of a supply reel and a take-up reel, and while discharge is produced between the wire and a metal mold secured on a work table, the work table is moved finely to perforate a hole of a predetermined shape into the metal mold.

The diameter of a wire used as electrodes normally ranges from approximately 0.1 to 0.3 mm, and a wire of about 5 kg wound on the supply reel is continuously supplied at the speed of 80 to 250 mm/sec.

In recent years, it is considered that, since a wire after use, drawn out from a discharge roller of a wire electrode discharge machine, cannot be re-used as it is, it is more advantageous to accommodate the wire directly from the discharge roller continuously and incontinently into a wire receiving vessel once without taking it up onto a take-up reel and then melting it collectively to re-use it. It is to be noted that it is generally inevitable to employ such incontinent accommodation four wire electrode discharge machines having an automatic wire connecting function.

In a wire electrode discharge machine of the incontinent accommodation type, if a wire after use is continuously accommodated into the wire receiving vessel, then the apparent specific gravity of the wire accumulated bulkily is as high as about one thirtieth, and the volume of the space occupied by the wire sometimes becomes so large that the wire may overflow from the vessel in a short period of time and wind itself around a discharge roller of the wire electrode discharge machine as the volume of the wire increases.

Accordingly, during operation, an operator must necessarily frequently watch a flow of a wire during use, and also the operation for regulating the flow is cumbersome and makes a factor of obstruction to automation.

It is, therefore, a possible idea to cut a wire after use into fragments or small pieces. A wire cutting apparatus for a discharge machine of the type just mentioned is disclosed, for example, in Japanese Utility Model Laid-Open Application No. Heisei 2-38141 and shown in FIG. 10.

Referring to FIG. 10, the wire cutting apparatus for a discharge machine shown is located at a terminal of a wire electrode discharge machine and constructed such that a wire r drawn out from the wire electrode discharge machine is cut into chips of the length of 6 cm by means of a rotary blade p mounted on a rotary shaft driven by a gear motor and a fixed blade q located in an opposing relationship to the rotary blade p, and the chips of the wire r are accommodated into a vessel prepared separately.

In particular, the wire r after use drawn out from the wire electrode discharge machine is guided by a guide tube s and is caught between a pair of feed rollers t. The wire r thus caught between the feed rollers t is fed downwardly along a side face of the fixed blade q and then nipped off into chips by the rotary blade p and the fixed blade q. The wire r in the form of chips drops along a guide plate u so that it is accommodated into a vessel located separately.

With the wire cutting apparatus M for a discharge machine, however, since frictional resistance by contact is present between the wire r after use drawn out from the wire electrode discharge machine and the inner face of the guide tube s, if the length of the guide tube s is increased, then it sometimes occurs that the guide tube s is jammed with the wire r, resulting in failure to continue operation of the apparatus.

Accordingly, the wire cutting apparatus M for a discharge machine must be located in the proximity of the wire discharging exit of the discharge machine. Consequently, the wire cutting apparatus M is disadvantageous in that an impact upon operation of the cutting blade thereof may be transmitted to the discharge machine and have a bad influence on the working accuracy of the discharge machine. Further, since cutting is performed by the single rotary blade p mounted on the rotary shaft, a single cutting operation is performed by a single rotation of the rotary shaft, and consequently, the length of chips after cut is as long as 6 cm. Accordingly, there is a disadvantage in that the volume of the space after the wire is discharged is not reduced very much and the operability for disposal of the wire is not improved remarkably.

SUMMARY OF THE INVENTION

It is an object of the present invention to provide an elongate object cutting apparatus which can cut an elongate object finely and at a high speed while production of vibrations or noises is reduced.

In order to attain the object described above, according to the present invention, there is provided an apparatus for cutting an elongate object, which comprises a frame, a fixed blade secured to the frame, a rotary blade having a plurality of knife edges on an outer periphery thereof and mounted for rotation on the frame such that the knife edges thereof successively contact with the fixed blade during rotation thereof, and means for driving the rotary blade to rotate to cooperate with the fixed blade to cut an elongate object supplied between the fixed blade and the rotary blade.

With the elongate object cutting apparatus, an elongate object is supplied between the fixed blade and the rotary blade while the rotary blade is rotated with the knife edges thereof successively contacted with the fixed blade. Consequently, the elongate object is successively cut by and between the rotary blade and the fixed blade. Accordingly, different from conventional elongate object cutting apparatus which involve back and forth movement or rocking motion of a sliding blade, the elongate object cutting apparatus of the present invention does not produce vibrations or noise very much and allows high speed rotation of the rotary blade to achieve high speed cutting and fine cutting particularly where an increased number of knife edges are provided on the rotary blade.

Preferably, the knife edges of the rotary blade are formed spirally with respect to an axis of rotation of the rotary blade. Such spiral formation of the knife edges of the rotary blade assures smooth cutting operation of the rotary blade and is effective to prevent or reduce vibrations or noise and also to enhance productivity at the cutting step.

Preferably a knife edge of the mixed blade is formed on a circumferential edge of a small hole formed at an inlet port of the fixed blade for an elongate object, and the fixed blade is in the form of a body of revolution and is received for rotation around an axis thereof on the frame such that it is releasably fixed at any rotational position to the frame. Thus, when the knife edge of the fixed blade becomes abraded it is rotated a little around its axis and secured there again. Consequently, a new portion of the knife edge of the fixed blade will thereafter contact with the knife edges of the rotary blade. Accordingly the entire circumference of the fixed blade can be utilized without exchanging the fixed blade. Consequently, a long life of the fixed blade is assured, and the time for which operation of the apparatus is rendered inoperative for replacement of the fixed blade is reduced, resulting in enhancement of the operation efficiency of the cutting apparatus.

Alternatively, the fixed blade can have a linear knife edge, and the frame can include a fixed blade mounting plate having the fixed blade mounted along a side face thereof, and a fixed blade positioning plate secured in contact and cooperating with the face of the fixed blade mounting plate to define an inlet port for introducing an elongate object therethrough.

The elongate object may be a terminal carrier including a plurality of terminals connected in a chain or a wire used for a wire electrode discharge machine.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
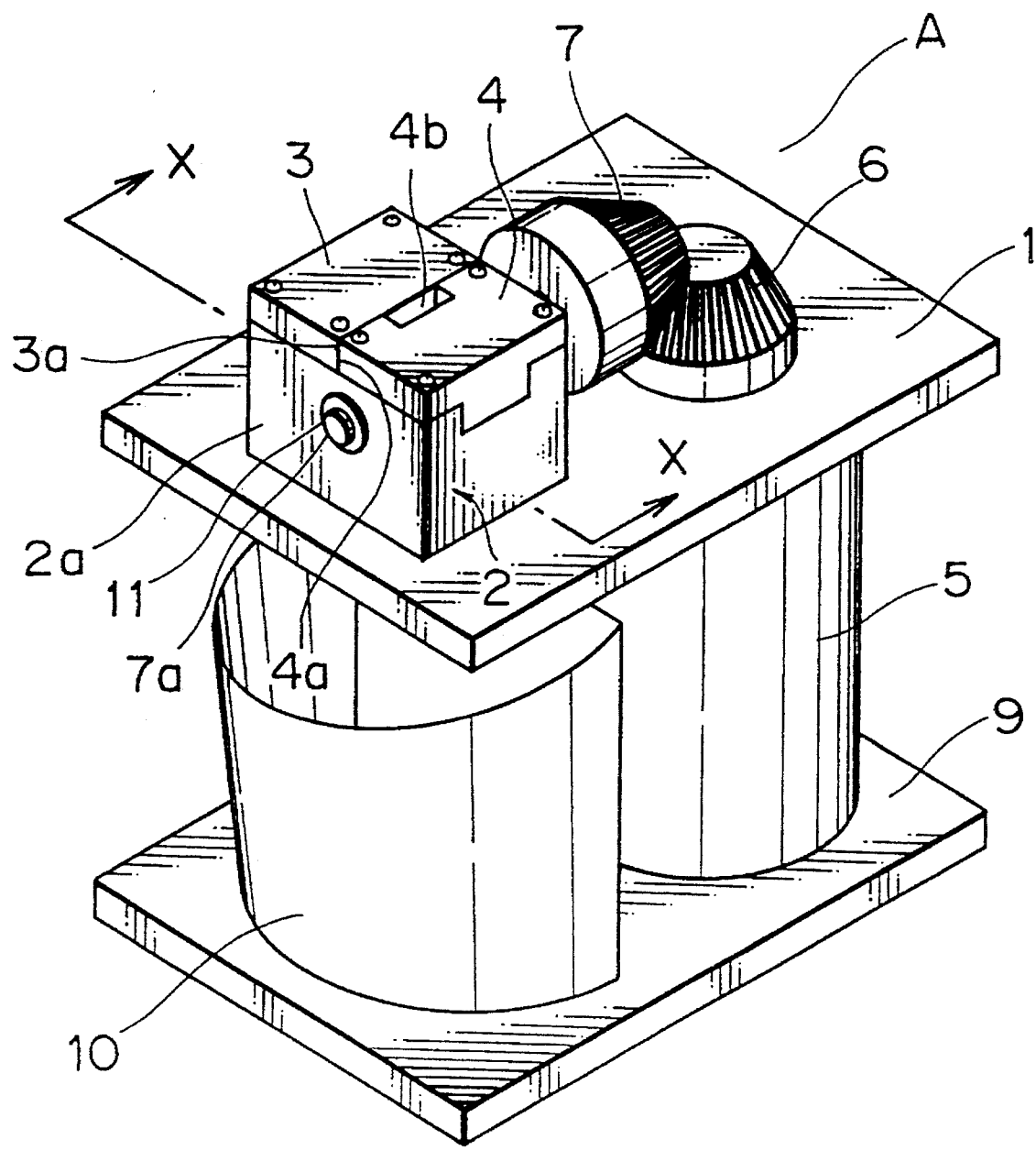
FIG. 1 is a perspective view of a terminal carrier cutting apparatus showing a preferred embodiment of the present invention.
Figure 2:
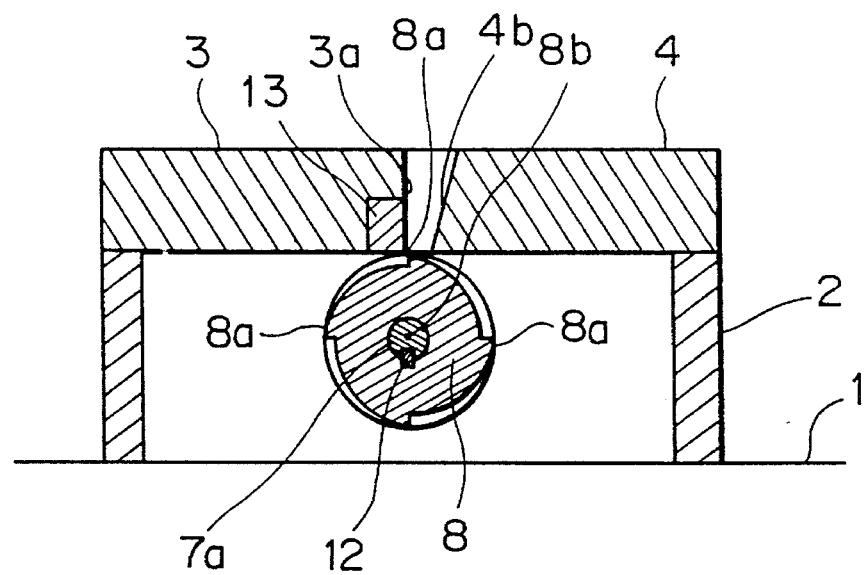
FIG. 2 is a sectional view taken along line X—X in FIG. 1.
Figure 3:
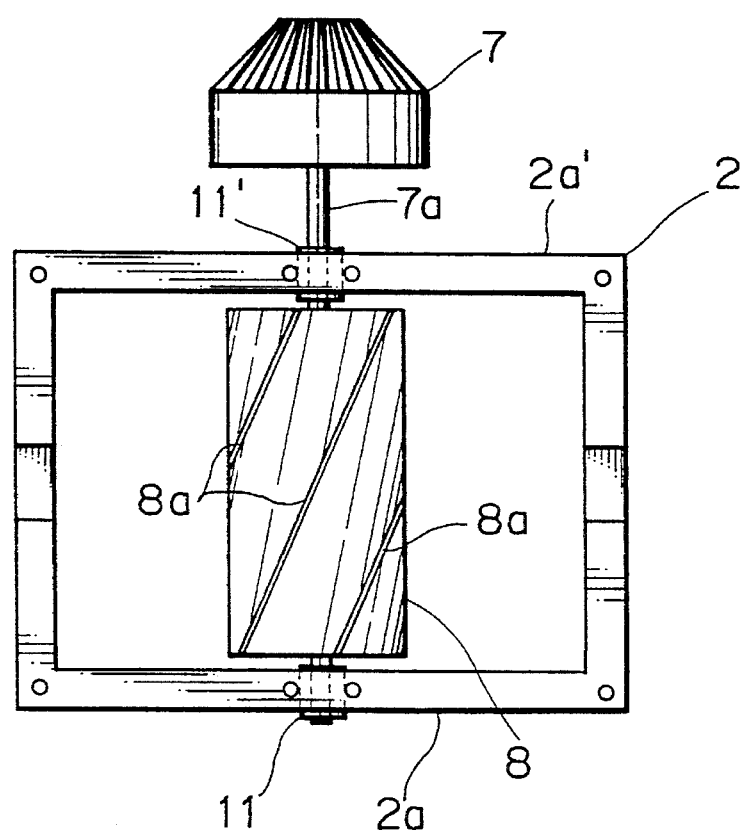
FIG. 3 is a plan view of a rotary blade support table and a rotary blade of the terminal carrier cutting apparatus shown in FIG. 1.

Referring first to FIGS. 1 to 3, there is shown a terminal carrier cutting apparatus for principally cutting a terminal carrier as an elongate object to which the present invention is applied. The terminal carrier cutting apparatus is generally denoted at A and includes a rotary blade support table 2, a fixed blade mounting plate 3 and a fixed blade positioning plate 4 all located on a frame 1, a motor 5, a drive gear 6 which is rotated by the motor 5, a driven gear 7 held in meshing engagement with the drive gear 6, and a rotary blade 8 mounted on a shaft 7a of the driven gear 7. A chip box 10 for accommodating cut small pieces of a terminal carrier therein are mounted on a base 9, and also the frame 1 is secured to the base 9 by suitable means not shown.

The fixed blade support table 2 is formed as a rectangular frame as seen from FIG. 3, and the shaft 7a of the driven gear 7 is supported for rotation on the fixed blade support table 2 by means of a pair of bearings 11 and 11' mounted on side walls 2a and 2a' of the fixed blade support table 2.

The rotary blade 8 is secured to the shaft 7a of the driven gear 7 by means of a key 12. The rotary blade 8 is made of a hand metal and has four knife edges 8a on an outer periphery thereof.

While the knife edges 8a of the rotary blade 8 may be formed linearly at an angularly equally spaced relationship on the outer periphery of a cylindrical profile, preferably they are formed spirally with respect to an axis 8b of rotation of the rotary blade 8, that is, the center of axis of the shaft 7a of the driven shaft 7.

The fixed blade mounting plate 3 is mounted on one side of the top of the rotary blade support table 2, and a fixed blade 13 having a linear profile is fitted at a lower edge of an end portion 3a of the fixed blade mounting plate 3 located just above the shaft 7a. The fixed blade 13 is made of cemented carbide, a ceramic material or some other suitable material.

The fixed blade positioning plate 4 is mounted on the other side of the top of the fixed blade support table 2 such that a terminal carrier inlet point 4b is formed substantially at a central portion of an end portion 4a of the fixed blade positioning plate 4. In order to mount the fixed blade mounting plate 3 and the fixed blade positioning plate 4 onto the rotary blade support table, while the end portion 3a of the fixed blade mounting plate 3 and the end portion 4a of the fixed blade positioning plate 4 are held in contact with each other, the rotary blade 8 and the fixed blade 13 are disposed at locations at which the knife edges 8a of the rotary blade 8 can rotate in an appropriately contacting relationship with the fixed blade 13. Then, the fixed blade positioning plate 4 is first secured to the rotary blade support table 2 by suitable means such as screws, and then the fixed blade mounting plate 3 is secured to the rotary blade support table 2 by suitable means such as screws.

Where the fixed blade positioning plate 4 is secured in advance of the rotary blade support table 2, there is an advantage in that a positioning operation in assembling the fixed blade mounting plate 3 disassembled once in order to perform replacement or polishing of the fixed blade 13 can be performed simply and accurately.

In order to cut a terminal carrier using the terminal carrier cutting apparatus A described above, the terminal carrier will be inserted into the terminal carrier inlet port 4b and then the motor 5 is energized. Rotation of the motor 5 is transmitted to the rotary blade 8 by way of the drive gear 6 and the driven gear 7, and the terminal carrier is cut by and between the knife edge 8a of the rotating rotary blade 8 and the fixed blade 13. A fragment or small piece of the terminal carrier thus cut away drops and is accommodated into the chip box 10.

It is to be noted that the terminal carrier cutting apparatus A can be used to cut not only a terminal carrier but also such other flexible elongate objects as an electric wire or a wire of a discharge machine.

Figure 4:
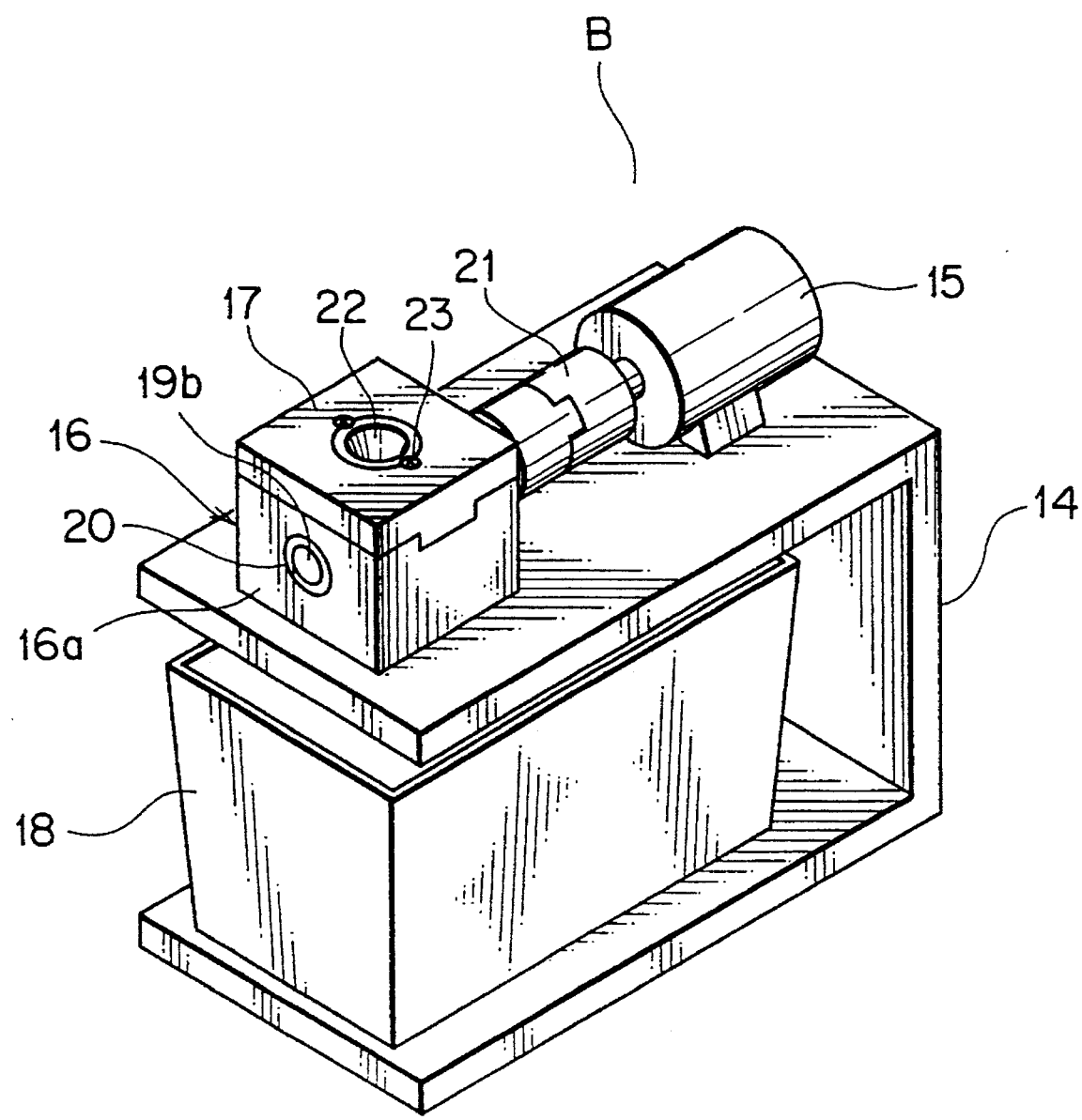
FIG. 4 is a perspective view of an elongate object cutting apparatus showing another preferred embodiment of the present invention.

Referring now to FIG. 4, there is shown a flexible elongate object cutting apparatus according to another preferred embodiment of the present invention. The flexible elongate object cutting apparatus shown is generally denoted at B and includes a small motor 15, a rotary blade fixing table 16 and a fixed blade mounting plate 17 all secured to a frame 14, and a chip box 18 located just below the rotary blade fixing table 16.

Figure 5:
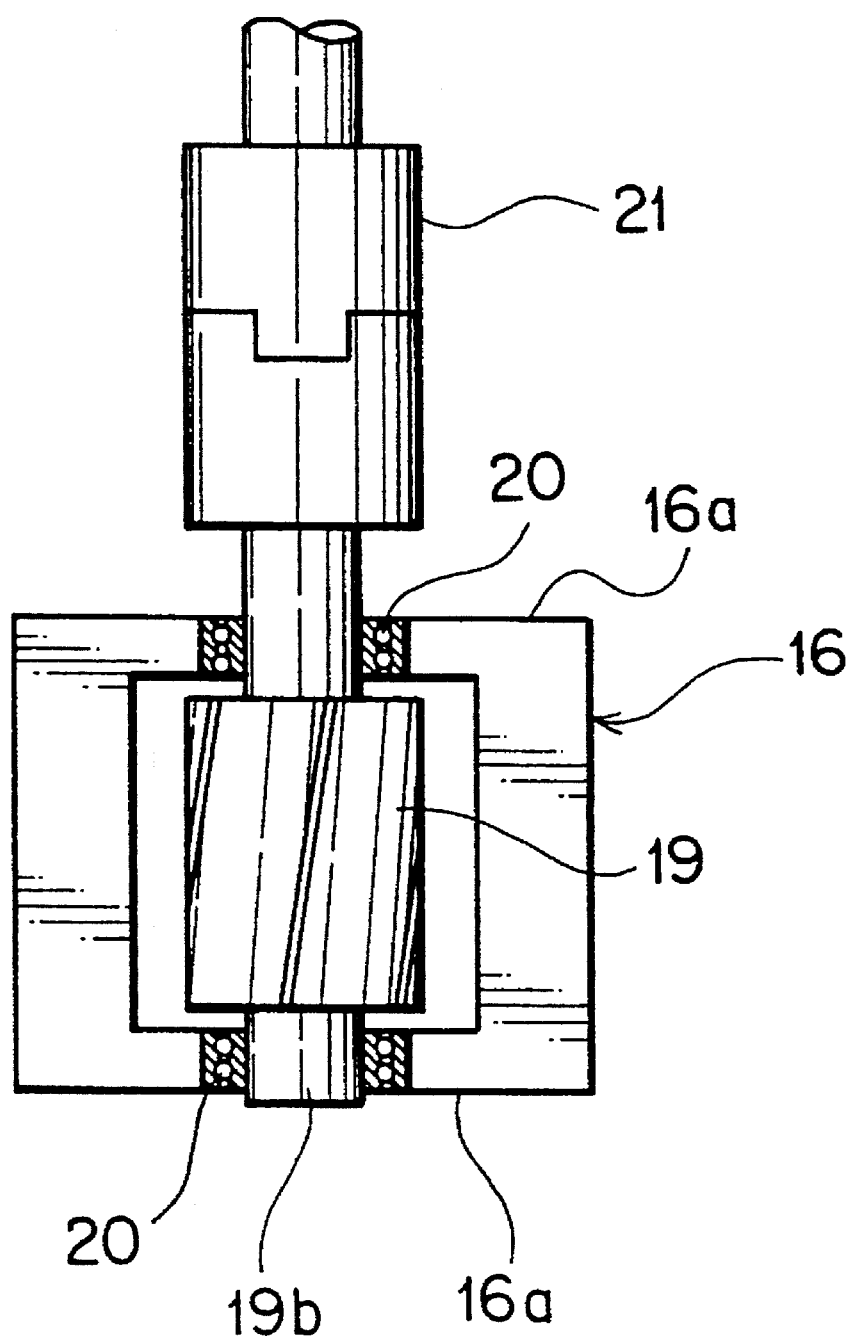
FIG. 5 is a plan view showing the inside of a rotary blade fixing table of the elongate object cutting apparatus shown in FIG. 4.
Figure 6:
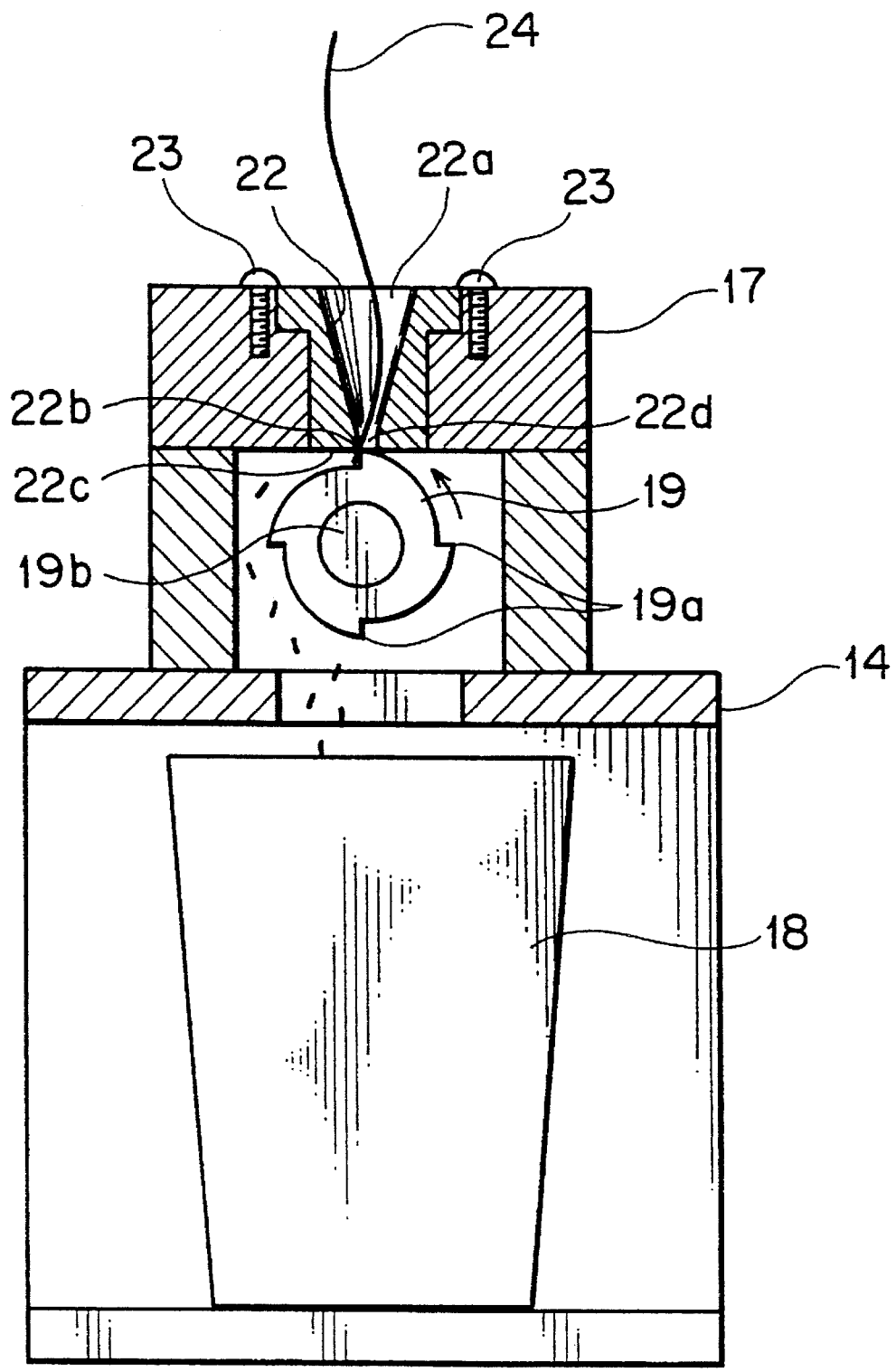
FIG. 6 is a side elevational view, partly in section, showing a cutting mechanism by a fixed blade and a rotary blade of the elongate object cutting apparatus shown in FIG. 4.
Figure 7:
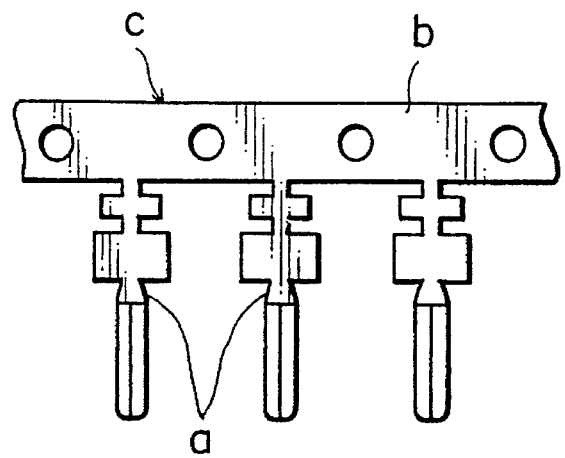
FIG. 7 is a plan view of a terminal carrier.
Figure 8:
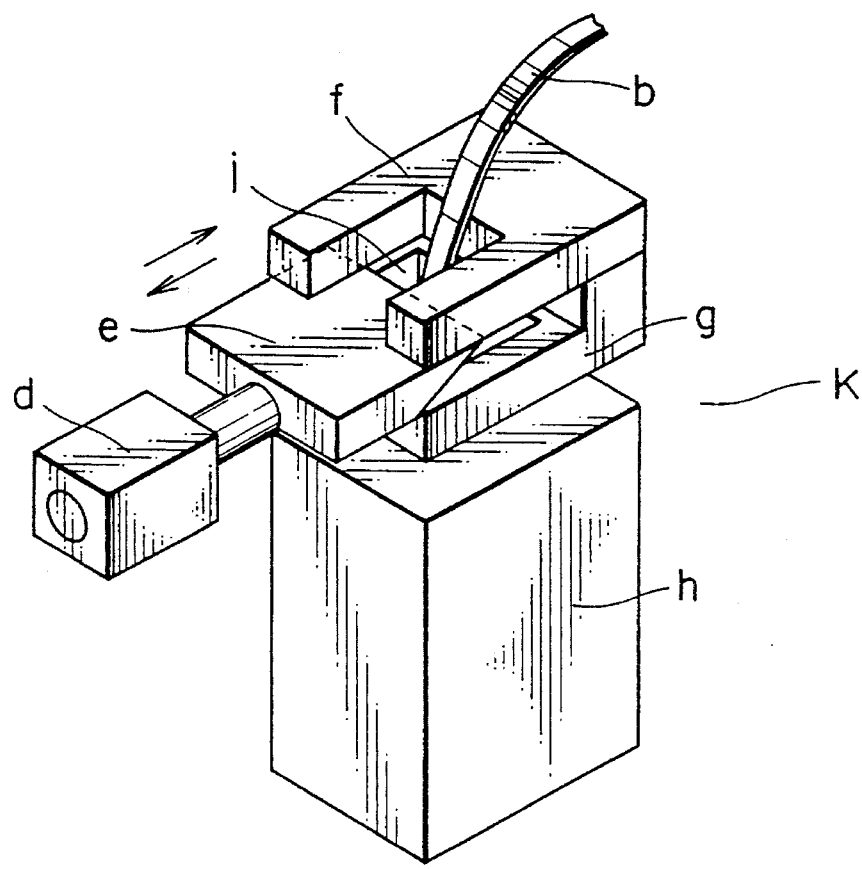
FIG. 8 is a perspective view of a conventional terminal carrier cutting apparatus.
Figure 9:
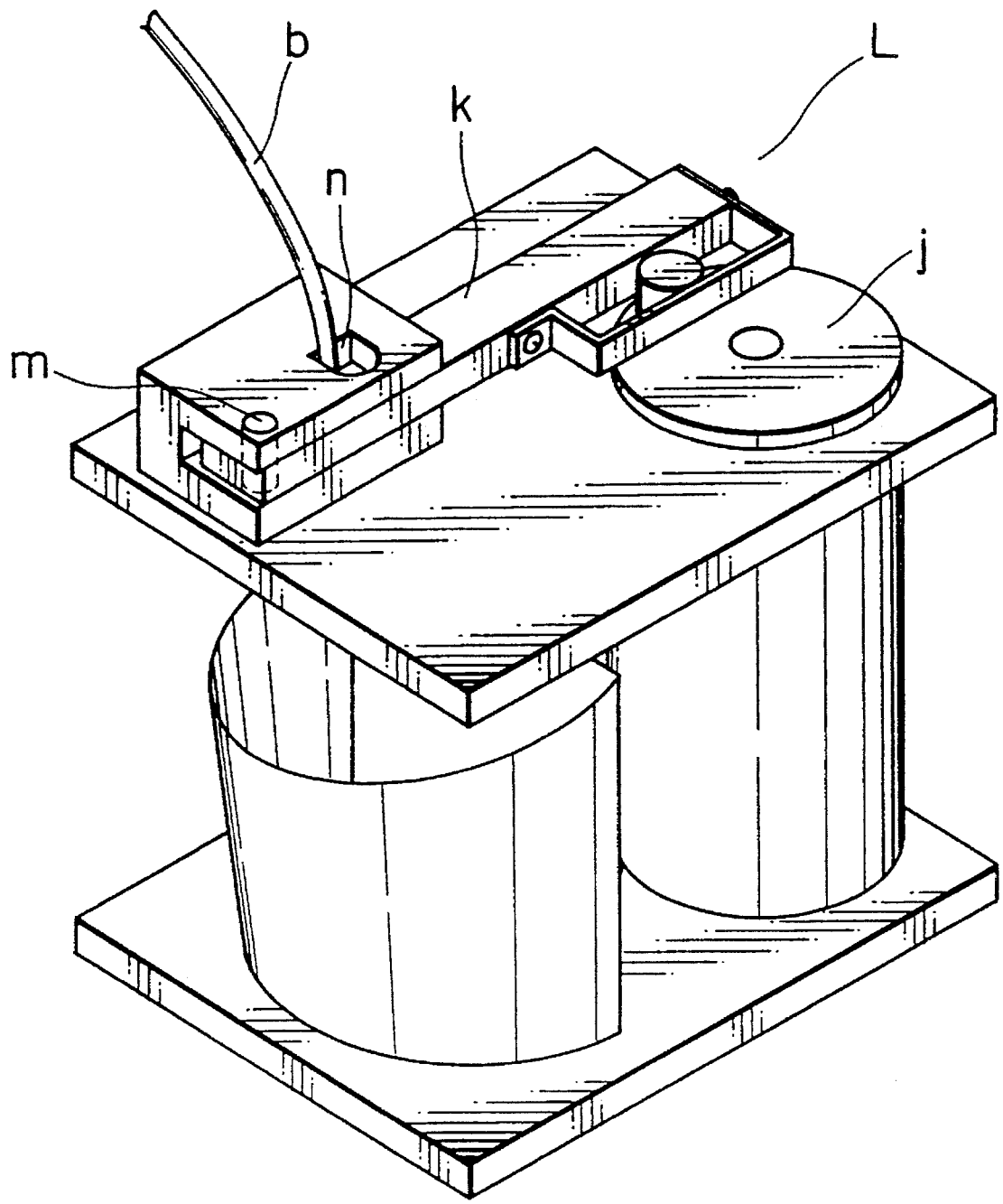
FIG. 9 is a perspective view of another conventional terminal carrier cutting apparatus.
Figure 10:
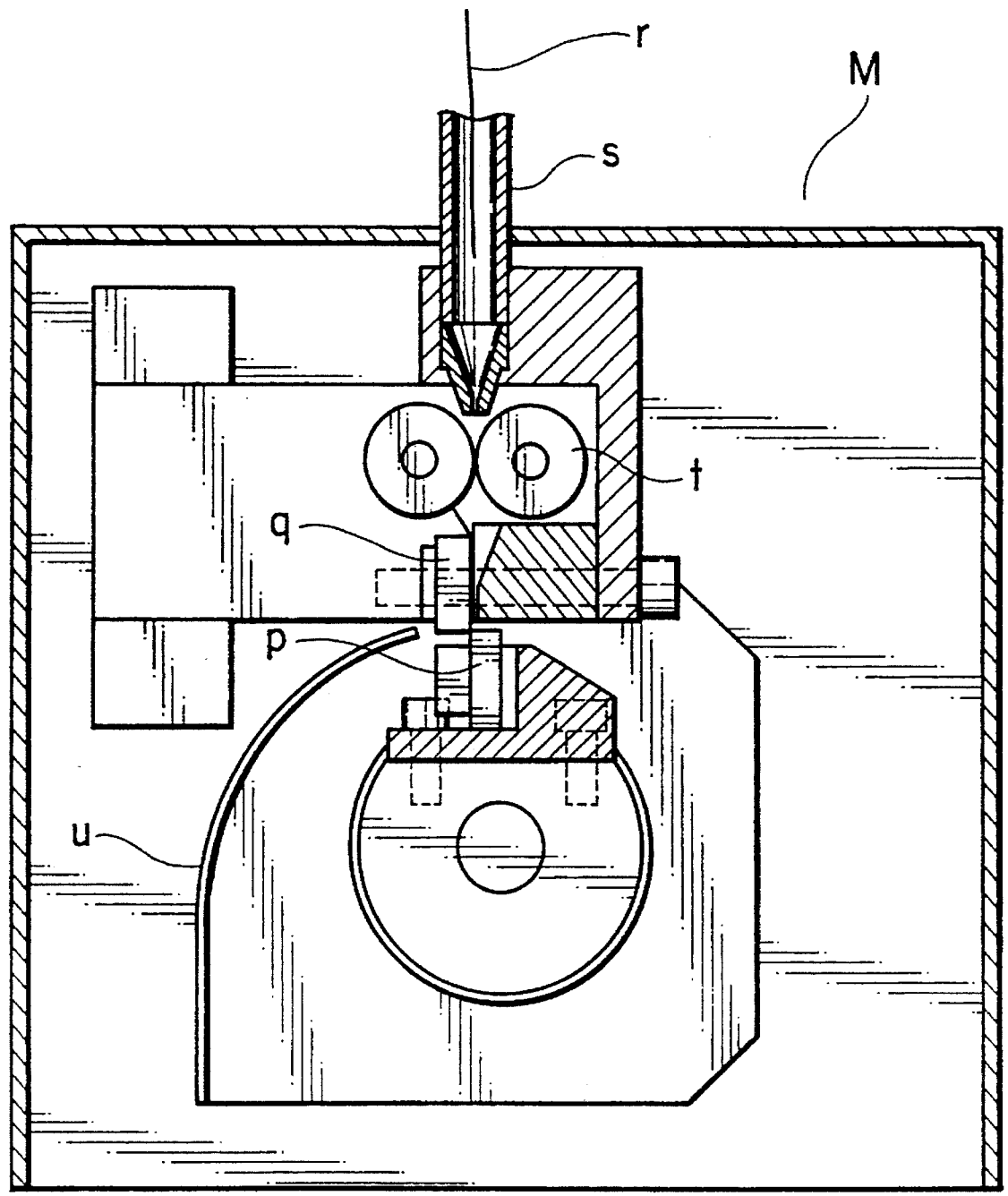
FIG. 10 is a side elevational view of a conventional wire cutting apparatus for a discharge machine.

Referring also to FIGS. 5 and 6, a bearing 20 is mounted on each of a pair of opposing side walls 16a of the rotary blade fixing table 16, and a rotary shaft 19b of a rotary blade 19 is supported for rotation on the rotary blade fixing table 16 by means of the bearings 20. The rotary blade 19 has a plurality of spiral knife edges 19a provided on an outer periphery thereof, and the rotary shaft 19a of the rotary blade 19 is connected to the small motor 15 by way of a coupling 21.

The fixed blade mounting plate 17 is secured to the top of the rotary blade fixing table 16, and a fixed blade 22 made of cemented carbide and having a cylindrical outer periphery is mounted on the fixed blade mounting table 17 by means of fixing screws 23. The fixed blade 22 has a funnel-shaped inlet port 22a extending vertically therethrough such that it is open wide at the top end thereof so as to allow a flexible elongate object 24, such as a wire, to be introduced into the inlet port 22a readily while it is reduced in diameter at the lower end thereof to form a small hole 22d which is open to a cutting plane 22c. Further, a knife edge 22b is formed on a circumferential edge of the small hole 22d of the inlet port 22a.

The elongate body 24 is introduced into the funnel-shaped inlet port 22a of the fixed blade 22 toward the knife edge 22b and then is cut by and between a knife edge 19a of the rotary blade 19 and the knife edge 22b of the fixed blade 22 into chips as the rotary blade 19 is rotated in the direction indicated by an arrow mark in FIG. 6. The chips thus cut drop and are accommodated into the chip box 18.

Since the knife edge 22b of the fixed blade 22 is formed on the circumferential edge of the small hole 22d, it contacts with and is abraded only at a portion thereof by a knife edge 19a of the rotary blade 19 and the elongate object 24. When the knife edge 22b of the fixed blade 22 becomes abraded, the fixing screws 23 are loosened and then the fixed blade 22 is rotated a little around an axis thereof and then secured there again. Consequently, a new portion of the knife edge 22 will thereafter contact with a knife edge 19a of the rotary blade 19. In this manner, the entire circumference of the knife edge 22b can be utilized without replacing the fixed blade 22. Accordingly, the life of the fixed blade 22 is elongated, and the time for which operation of the apparatus is stopped for replacement of the fixed blade is reduced.

Consequently, the operation efficiency of the cutting apparatus is improved.

The length of cut small pieces of the elongate object 24 depends upon the supplying rate of the elongate object 24 and the speed of rotation of the rotary blade 19, and as the length of chips increases, the bulkiness of such chips is not decreased but the accommodation space is increased. However, with the present cutting apparatus, since the cutting length is approximately 5 mm to the utmost, there is an advantage in that the accommodation space for chips is reduced.

Having now fully described the invention, it will be apparent to one of ordinary skill in the art that many changes and modifications can be made thereto without departing from the spirit and scope of the invention as set forth herein.

What is claimed is:

1. An apparatus for cutting an elongate object, comprising:

a frame;

a support table on said frame including oppositely spaced, upstanding sides and a mounting plate extending across the upper ends of said sides;

a fixed blade secured to said mounting plate;

a rotary blade having a plurality of knife edges on an outer periphery thereof mounted for rotation in bearings in the sides of said support table such that said knife edges thereof successively contact with said fixed blade at a cutting nip during rotation of said rotary blade;

means forming an inlet port extending through said mounting plate for passing an elongate object into cutting relation between said knife edges and said fixed blade; and means for rotatably driving said rotary blade to cooperate with said fixed blade to cut said elongate object supplied between said fixed blade and said rotary blade.

2. An apparatus for cutting an elongate object as claimed in claim 1, wherein said knife edges of said rotary blade are formed spirally with respect to an axis of rotation of said rotary blade.

3. An apparatus for cutting an elongate object as claimed in claim 1, wherein-said fixed blade has a linear knife edge, mounted along a side face of said mounting plate, and a fixed blade positioning plate secured in contact and cooperating with said face of said fixed blade mounting plate to define said inlet port for introducing an elongate object therethrough.

4. An apparatus for cutting an elongate object as claimed in claim 1, wherein said inlet port is sized and disposed for passage of a terminal carrier containing a plurality of terminals connected in a chain.

5. An apparatus for cutting an elongate object as claimed in claim 1, wherein said inlet port is sized and disposed for passage of a wire used for a wire electrode discharge machine.

6. An apparatus for cutting an elongate object comprising:

a frame;

a fixed blade secured to said frame;

a rotary blade having a plurality of knife edges on an outer periphery thereof and mounted on said frame for rotation such that said knife edges successively contact with said fixed blade; and means for rotatably driving said rotary blade to cooperate with said fixed blade to cut an elongate object supplied between said fixed blade and said rotary blade, wherein said frame has an inlet port formed therethrough for an elongate object, and a knife edge of said fixed blade is formed as a circumferential edge of a small hole formed at said inlet port, and wherein said fixed blade is in the form of a body of revolution and is received for rotation around an axis thereof on said frame such that it is releasably fixed at any rotational position to said frame.

* * * * *